(12) United States Patent
Oshima et al.

(10) Patent No.: US 7,134,054 B2
(45) Date of Patent: **\*Nov. 7, 2006**

(54) METHOD FOR MONITORING FAULT OF OPERATING SYSTEM AND APPLICATION PROGRAM

(75) Inventors: Satoshi Oshima, Tachikawa (JP); Toshiaki Arai, Machida (JP); Noboru Sakoyama, Kasugai (JP)

(73) Assignee: Hitachi, Ltd., Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 10/755,283

(22) Filed: Jan. 13, 2004

(65) Prior Publication Data

US 2004/0153834 A1 Aug. 5, 2004

Related U.S. Application Data

(63) Continuation of application No. 09/642,769, filed on Aug. 22, 2000, now Pat. No. 6,697,972.

(30) Foreign Application Priority Data

Sep. 27, 1999 (JP) ............................ 11-273270

(51) Int. Cl.
*G06F 11/00* (2006.01)
(52) U.S. Cl. ....................................... 714/55
(58) Field of Classification Search .......... 714/13, 714/55
See application file for complete search history.

(56) References Cited

U.S. PATENT DOCUMENTS

| | | | |
|---|---|---|---|
| 4,809,280 A | 2/1989 | Shonaka | 714/55 |
| 5,875,484 A | 2/1999 | Neuhard et al. | 711/167 |
| 6,314,501 B1 | 11/2001 | Gulick et al. | 711/153 |
| 6,446,225 B1 | 9/2002 | Robsman et al. | 714/55 |
| 2001/0016879 A1 | 8/2001 | Sekiguchi et al. | 709/319 |
| 2001/0025371 A1 | 9/2001 | Sato et al. | 717/4 |
| 2002/0116670 A1 | 8/2002 | Oshima et al. | 714/55 |

FOREIGN PATENT DOCUMENTS

JP 10222388 8/1998

OTHER PUBLICATIONS

T. Nanya, "Fault Tolerant Computer", published by Ohm-Sha, Feb. 5, 1991, pp. 44-51 and 143-149.

Y. Miyazaki, et al "Open System Establish in Industrial-purpose Personal Computers and Emphasis on "Dependable Characteristics":Measures of Reliability as to element technique and the way to progress". pp. 22-26. (English Translation attached).

*Primary Examiner*—Scott Baderman
*Assistant Examiner*—Joshua Lohn
(74) *Attorney, Agent, or Firm*—Mattingly, Stanger, Malur & Brundidge, P.C.

(57) ABSTRACT

A fault of an operating system (OS) is observed, and in addition to application program (AP) fault monitoring, check-point information is preserved without adding dedicated hardware. In a computer having a multi-OS environment, an AP fault monitor and a monitored AP operate on a first OS. A fault monitor operates on a second OS. Each of the first OS and the AP fault monitor transmits an alive message to the fault monitor by utilizing an inter-OS communication function of a multi-OS controller. The fault monitor monitors the alive message of each of the first OS and the AP fault monitor. The monitored AP also transmits an alive message to the AP fault monitor for monitoring. The monitored AP preserves check-point information in a region of a memory. In the region of the memory, information is preserved by a fault and restart of the first OS as well.

17 Claims, 6 Drawing Sheets

FIG.2

| | | | |
|---|---|---|---|
| | | ... | |
| 12 — | HIGH RANK MONITOR CONTROL INFORMATION | MONITORED SUBJECT ID 18 | OS FAULT DETECTION TIME — 13 |
| | | | OS FAULT RECOVERY METHOD — 14 |
| | | MONITORED SUBJECT ID 20 | AP MONITOR FAULT DETECTION TIME — 15 |
| | | | AP MONITOR FAULT RECOVERY METHOD — 16 |
| | | ... | |
| 17 — | FIRST OS CONTROL INFORMATION | MONITORED SUBJECT ID | — 18 |
| | | ... | |
| 19 — | AP MONITOR CONTROL INFORMATION | MONITORED SUBJECT ID | — 20 |
| | | AP FAULT DETECTION TIME | — 21 |
| | | AP FAULT RECOVERY METHOD | — 22 |
| | | ... | |
| 23 — | MONITORED AP CONTROL INFORMATION | CHECK-POINT IDENTIFIER ID | — 24 |
| | | CHECK-POINT REGION | — 25 |

9

METHOD FOR MONITORING FAULT OF OPERATING SYSTEM AND APPLICATION PROGRAM

The present application is a continuation of application Ser. No. 09/642,769, filed Aug. 22, 2000 now U.S. Pat. No. 6,697,972, the contents of which are incorporated herein by reference.

BACKGROUND OF THE INVENTION

The present invention relates to a fault monitoring method for computer, and in particular to a fault monitoring method of an operating system (OS) and an application program (AP).

In general, an AP encounters a fault for several reasons and stops. Main causes are defects included in the AP itself and faults of an OS on which the AP is mounted. As for such an AP that its operation needs to be continued, the following method has been adopted. A fault is monitored. If a fault has been detected, then the operation of the AP is resumed from a state in which it was before the occurrence of the fault, and thereby recovery of the AP from the fault is attempted.

As one of fault monitoring methods for AP and OS, there is a method called watchdog. "Fault Tolerant Computer" written by Takashi NANYA, published by OHM-SHA says "The watchdog timer is a different process which is independent of a monitored process. The monitored process is so designed that a timer is reset at intervals of a fixed time (for example, in the range of several microseconds to several minutes) during the execution of the monitored process. If the timer is not reset until the time is up, some fault is considered to have occurred in the monitored process."

In the case where a fault of an AP is monitored, an AP fault monitor having a watchdog receives a periodical alive message from the AP. If the alive message stops for a predetermined time, the AP fault monitor judges an AP fault to have occurred and restarts the AP. In the case where a fault of an OS is monitored, an OS fault monitor having a watchdog receives a periodical alive message from the OS. If the alive message disappears for a predetermined time, the OS fault monitor judges an OS fault to have occurred and restarts the OS.

Furthermore, for recovery of an AP from a fault, a technique called check-point is used. In the check-point technique, execution information of the AP is acquired from the monitored AP periodically and reserved. When a fault has occurred, the reserved execution information is taken out, and processing of the AP is resumed from a check-point.

As for an AP fault monitor using software, the AP fault monitor operates on the same OS as the monitored AP. In some cases, therefore, the AP fault monitor using software cannot cope with such an AP fault caused by the OS. Furthermore, there is known such an OS fault monitoring method that a watchdog is formed of dedicated hardware and the watchdog monitors a periodical alive message supplied from an OS. However, there is a problem that dedicated hardware must be prepared.

On the other hand, as for the check-point, if check-point information is preserved in a low speed memory, then it takes a considerable time to preserve the check-point information, and consequently the check-point repetition period becomes long. As a result, recovery from a fault must be conducted from a state of a considerably long time before the time of the fault occurrence. Furthermore, it is possible to provide a high speed non-volatile memory, such as a static RAM, apart from a volatile memory, such as a dynamic RAM, managed by the OS, and preserve check-point information in the high speed non-volatile memory. However, there is a problem that dedicated hardware must be prepared.

SUMMARY OF THE INVENTION

An object of the present invention is to provide a method for monitoring a fault of the OS by using software, without adding dedicated hardware, Another object of the present invention is to provide a method for monitoring a fault of an AP and preserving check-point information of the AP at high speed without adding dedicated hardware.

The present invention solves the above described problems. In accordance with the present invention, in an operating system fault monitoring method for a computer, the computer including a first OS, a second OS different from the first OS, a multi-OS controller for managing computer resources, the multi-OS controller having inter-OS communication means between the first OS and the second OS, and a fault monitor operating on the second OS, the operating system fault monitoring method includes the steps of transmitting an alive message from the first OS to the fault monitor via the inter-OS communication means, and determining whether the alive message has been received by the fault monitor within a predetermined time.

In accordance with the present invention, in an application program fault monitoring method for a computer, the computer including an AP fault monitor operating on the first OS, and a high rank fault monitor operating on a second OS to monitor not only a fault of the first OS but also a fault of the AP fault monitor via inter-OS communication means, the application program fault monitoring method includes the step of monitoring a fault of the AP fault monitor operating on the first OS by using the high rank fault monitor. An AP to be monitored by the AP fault monitor preserves check-point information in a shared memory region on a main memory. In the shared memory region, information is preserved by a fault and restart of the first OS as well.

According to the present invention, fault monitoring of an OS to be monitored is conducted by utilizing a multi-OS environment and using a high rank fault monitor operating on another OS, as heretofore described. Without adding dedicated hardware, therefore, a fault of the OS can be monitored. Furthermore, a fault of an AP fault monitor can also be monitored by using the high rank fault monitor. Furthermore, since the high rank fault monitor using software is used, a recovery method to be used when a fault of each of the OS and AP fault monitor has occurred can be set finely. In addition, a monitored AP can preserve check-point information at high speed without adding dedicated hardware.

BRIEF DESCRIPTION OF THE DRAWINGS

FIG. 2 is a diagram showing the configuration of a storage region in a memory, in the embodiment shown in FIG. 1;

DESCRIPTION OF THE PREFERRED EMBODIMENT

Hereafter, an embodiment of the present invention will be described.

Figure 1:
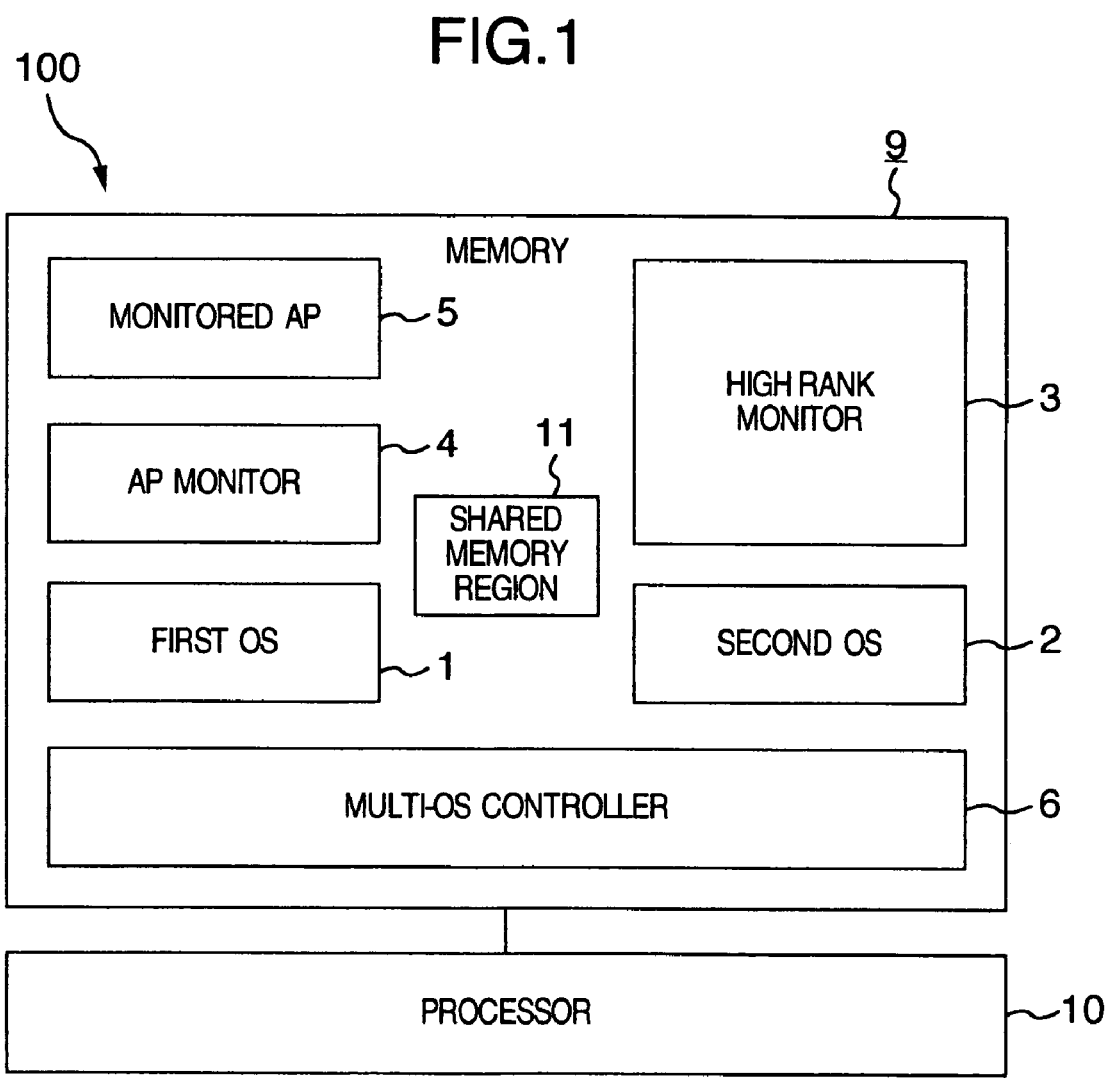
FIG. 1 is a diagram showing the configuration of a computer forming an embodiment of the present invention.

FIG. 1 is a diagram showing the configuration of a computer 100 in the present embodiment. The computer 100 can be divided broadly into a processor 10 and a memory (main storage) 9. An input/output device and a storage connected to the processor 10 are not illustrated. The memory 9 stores programs of a first OS 1, a second OS 2, a high rank fault monitor (hereafter referred to as "high rank monitor") 3, an AP fault monitor (hereafter referred to as "AP monitor") 4, a monitored AP 5, and a multi-OS controller 6. These programs are executed by the processor 10. Furthermore, the memory 9 includes a shared memory region 11 which can be accessed by both the first OS 1 and the second OS 2.

The monitored AP 5 is an application mounted on the first OS 1. The monitored AP 5 may be a program for conducting general business application. The AP monitor 4 is an application mounted on the first OS 1, and it is a program for conducting fault monitoring of the monitored AP 5. The second OS 2 is an OS which is different from the first OS 1. The second OS 2 is desired to be an OS regarded as an OS having a higher reliability than the first OS 1. The high rank monitor 3 is an application mounted on the second OS 2, and it is a program for conducting fault monitoring of the first OS 1 and the AP monitor 4.

The multi-OS controller 6 has the following functions.

(a) Hardware Resource Division Function

The multi-OS controller 6 manages computer resources such as CPU time, the memory, external devices, and timers, and divides these resources and provides them to respective OSs. For example, as for timers, the multi-OS controller 6 has a function of virtually providing only one hardware timer to respective OSs. Furthermore, the multi-OS controller 6 has a function of reserving an I/O resource of an external device utilized by respective OSs.

(b) Inter-OS Message Passing Function

This is a function for allowing processes on respective OSs to conduct message passing. Unlike the shared memory communication, the process of the other party of communication can be called. In the embodiment of the present invention, this message passing function is utilized as an alive message.

(c) Inter-OS Shared Memory Communication Function

The multi-OS controller 6 secures a memory region which can be shared between OSs as a physical memory region independent of physical memory regions for respective OSs. The shared memory region is divided into several blocks and managed. Each block is provided with its identifier (ID). By utilizing this shared memory identifier (ID) or a pointer to the physical memory, each OS can access the shared memory. Supposing that information is not recorded in the memory region, each OS conducts memory initialization after it has been started. For example, when an OS is restarted at the time of a fault of the OS, a memory region in which the state and so on of an application has been preserved is initialized. However, the shared memory region is not initialized because it is located outside the OSs regions, and its contents are preserved. After restart, each OS can utilize a pseudo-non-volatile memory or a software manner by specifying the shared memory identifier (ID) used the last time or a pointer to a physical memory. In the embodiment of the present invention, the shared memory region is utilized as a check-point information storage region of the monitored AP.

(d) OS Fault Notice and Fault Recovery Function

The OS fault notice is a function of giving notice that a fault has occurred in a certain OS to the other OS. However, noticed faults are only faults that the OS itself is conscious of. Furthermore, there is a function of conducting recovery of a certain OS from a fault by restarting only the OS.

The monitored AP 5 transmits an alive message to the AP monitor 4 periodically. The AP monitor 4 determines whether it has received an alive message from the monitored AP 5 within a predetermined fault detection time. Unless an alive message has been received, the AP monitor 4 judges the stoppage to have been caused by a fault of the monitored AP 5. In accordance with a preset method for recovery from a fault, the AP monitor 4 conducts recovery processing of the monitored AP 5 in which a fault has occurred.

The first OS 1 and the AP monitor 4 periodically transmit alive mmessages to the high rank monitor 3 by utilizing the inter-OS message passing function of the multi-OS controller 6 independently respectively. The high rank monitor 3 determines whether it has received an alive message from each of the first OS 1 and the AP monitor 4 within a predetermined fault detection time. Unless an alive message has been received, the high rank monitor 3 judges the stoppage to have been caused by a fault of pertinent one of the first OS 1 and the AP monitor 4. In accordance with a preset method for recovery from a fault, high rank monitor 3 conducts recovery processing of the first OS 1 or the AP monitor 4 in which a fault has occurred.

The monitored AP 5 periodically stores checkpoint information in the shared memory region 11 of the memory 9. When the monitored AP 5 is restarted due to a fault of the first OS 1, the AP monitor 4, or the monitored AP 5, the monitored AP 5 takes out check-point information from the shared memory region 11, and resumes processing of the monitored AP 5 from the check-point. In the present embodiment, only the high rank monitor 3 is mounted on the second OS 2. The second OS 2 need only have a function for responding to a request from the high rank monitor 3. As compared with the first OS 1, the second OS 2 can be regarded as an OS which is small in overhead of CPU time and highly reliable. Typically, the memory occupation quantity of the second OS 2 is smaller than the memory occupation quantity of the first OS 1.

It is possible to store the first OS 1, the second OS 2, the high rank monitor 3 and the multi-OS controller 6, or the first OS 1, the second OS 2, the high rank monitor 3, the AP monitor 4 and the multi-OS controller 6 into a storage medium, read them into the memory 9 via a drive device connected to the processor 10 or transmit them to the memory 9 of another computer via a drive device connected to the computer, the computer, and a network, and execute them by using the processor 10.

FIG. 2 is a diagram showing the configuration of a storage region in the memory 9. However, a program region and the like are not illustrated. With regard to a region for storing control information and the like concerning the present invention, its data configuration is shown.

High rank monitor control information 12 is information placed in a memory region of the second OS 2 and accessed by the high rank monitor 3. As control information 12, OS fault detection time 13 and an OS fault recovery method 14 are stored with regard to a monitored subject ID 18, and AP monitor fault detection time 15 and an AP monitor fault recovery method 16 are stored with regard to a monitored subject ID 20. The monitored subject ID 18 is an identifier provided to the first OS 1. The OS fault detection time 13 is time allowed until an alive message is received from the first OS 1 when the high rank monitor 3 monitors a fault of the first OS 1. The OS fault recovery method 14 is information which indicates a recovery method at the time of a fault of the first OS 1. The OS fault recovery method 14 is divided into OS restart without memory dump, OS restart after memory dump acquisition, restart of only a specific function of an OS, and so on. The monitored subject ID 20 is an identifier provided to the AP monitor 4. AP monitor fault detection time 15 is time allowed until an alive message is received from the AP monitor 4 when the high rank monitor 3 monitors a fault of the AP monitor 4. The AP monitor fault recovery method 16 is information which indicates a method to be used when the AP monitor 4 is recovered from a fault. The AP monitor fault recovery method 16 is divided into restart of the AP monitor 4 and the monitored AP 5, restart of the first OS 1, the AP monitor 4 and the monitored AP 5, and so on.

Since the AP monitor 4 is considered to be higher in reliability than the first OS 1, a fault of the AP monitor 4 is caused in some cases by a fault of the first OS 1. In this case, a series of restart operations beginning with restart of the first OS 1 followed by restart of the AP monitor 4 are sometimes effective. First OS control information 17 is information placed in a memory region of the first OS 1 and accessed by the AP monitor 4. Monitored subject ID 18 is stored as the first OS control information 17. Control information required to restart the first OS 1 is stored.

AP monitor control information 19 is information placed in the memory region of the first OS 1 and accessed by the AP monitor 4. Monitored subject ID 20, AP fault detection time 21, and an AP fault recovery method 22 are stored as the AP monitor control information 19. The AP fault detection time 21 is time allowed until an alive message is received from the monitored AP 5 when the AP monitor 4 monitors a fault of the monitored AP 5. The AP fault recovery method 22 is information which indicates a method to be used when the AP monitor 4 recovers the monitored AP 5 from a fault. The AP fault recovery method 22 is divided into restart of only the monitored AP 5, restart of the AP monitor 4 and the monitored AP 5, restart of the first OS 1, the AP monitor 4 and the monitored AP 5, and so on. For the same reason as the case of the recovery of the AP monitor 4, a series of restart operations beginning with restart of the first OS 1 followed by restart of the monitored AP 5 are sometimes effective.

Monitored AP control information 23 is information placed in the shared memory region 11 and accessed by the monitored AP 5. A head block of a checkpoint region 25 is stored as check-point identifier ID 24. The check-point region 25 is a region for storing check-point information placed in the shared memory region 11 and accessed by the monitored AP 5.

Figure 3:
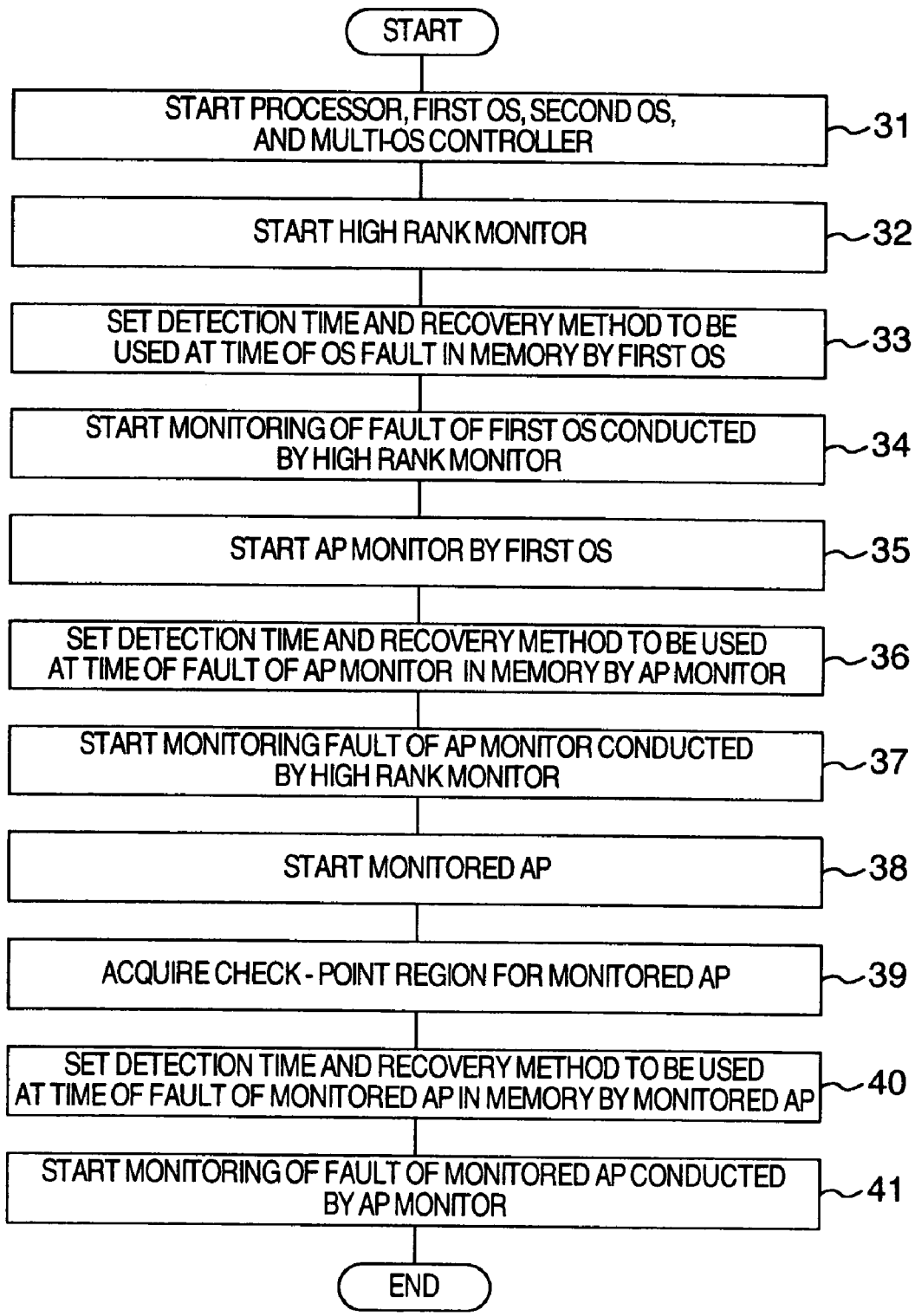
FIG. 3 is a flow chart showing the procedure of start processing of each program, in the embodiment shown in FIG. 1.

FIG. 3 is a flow chart showing the procedure of start processing of respective programs conducted when the multi-OS computer 100 which is the embodiment of the present invention is started. After the processor 10 is started, the first OS 1, the second OS 2 and the multi-OS controller 6 are started by execution of an automatic procedure (step 31). Upon being started, the multi-OS controller 6 conducts resource division using assignment of computer resources, such as CPU time, memories, and external devices, utilized by the first OS 1 and the second OS 2, by referring to a configuration management file which is not illustrated. Subsequently, the second OS 2 starts the high rank monitor 3 (step 32). Its start procedure is the same as an ordinary start procedure for starting an AP on the second OS 2. Its start is conducted manually, or automatically by executing a command line on a file.

Subsequently, the first OS 1 transmits OS fault detection time and an OS fault recovery method to the high rank monitor 3 via the multi-OS controller 6 and the second OS 2 by utilizing the inter-OS message passing function of the multi-OS controller 6. The high rank monitor 3 receives such information and sets the information in the memory 9 as the OS fault detection time 13 and the OS fault recovery method 14 (step 33). The high rank monitor 3 issues a monitored subject ID (for example, 01), adds it to the OS fault detection time 13 and the OS fault recovery method 14 on the memory. In addition, the high rank monitor 3 transmits the issued monitored subject ID to the first OS 1 via the second OS 2 and the multi-OS controller 6 by utilizing the inter-OS message passing function. The first OS 1 receives it and sets it in the memory 9 as the monitored subject ID 18 of the first OS control information 17. Thereafter, the high rank monitor 3 starts monitoring of the first OS 1 by referring to the OS fault detection time 13 (step 34). In other words, the first OS 1 transmits an alive message to the high rank monitor 3 via the multi-OS controller 6 and the second OS 2 by using the inter-OS message passing function. The high rank monitor 3 receives this alive message, and determines whether the alive message has been received within the OS fault detection time 13. Subsequently, the first OS 1 starts the AP monitor 4 (step 35). Its start procedure is the same as the ordinary start procedure for starting an AP on the first OS 1. The AP monitor 4 is automatically started manually or automatically by executing a command line on a file. Subsequently, the AP monitor 4 transmits AP monitor fault detection time and an AP monitor fault recovery method to the high rank monitor 3 via the first OS 1, the multi-OS controller 6 and the second OS 2 by utilizing the inter-OS message passing function. The high rank monitor 3 receives such information and sets the information in the memory 9 as the AP monitor fault detection time 15 and an AP monitor fault recovery method 16 of the monitor control information 12 (step 36). The high rank monitor 3 issues a monitored subject ID (for example, 02), and adds it to the AP monitor fault detection time 15 and an AP monitor fault recovery method 16 on the memory. In addition, the high rank monitor 3 transmits the issued monitored subject ID to the AP monitor 4 via the second OS 2, the multi-OS controller 6 and the first OS 1 by utilizing the inter-OS message passing function. The AP monitor 4 receives it and sets it in the memory 9 as the monitored subject ID 20 of the AP monitor control information 19. Thereafter, the high rank monitor 3 starts monitoring of the AP monitor 4 by referring to the monitor fault detection time 15 (step 37). In other words, the AP monitor 4 transmits an alive message to the high rank monitor 3 via the first OS 1, the multi-OS controller 6 and the second OS 2. The high rank monitor 3 receives this alive message, and determines whether the alive message has been received within the AP monitor fault detection time 15.

Subsequently, the first OS 1 starts the monitored AP 5 (step 38). The monitored AP 5 issues a request for the region of the check-point identifier ID 24 and the check-point region 25 to the multi-OS controller 6 via the first OS 1, and acquires them (step 39). Furthermore, the monitored AP 5 sets the identifier ID of the check-point region 25 in the check-point identifier ID 24 of the monitored AP control information 23. Subsequently, the monitored AP 5 transmits AP monitor fault detection time and an AP monitor fault recovery method to the AP monitor 4 by utilizing the inter-process communication function of the first OS 1. The AI' monitor 4 receives such information and sets the information in the memory 9 as the AP fault detection time 21 and an AP fault recovery method 22 of the monitor control information 19 (step 40). Thereafter, the AP monitor 4 starts monitoring of the monitored AP 5 by referring to the AP fault detection time 21 of the AP monitor control information 19 (step 41). In other words, the monitored AP 5 transmits an alive message to the AP monitor 4 by using the inter-process communication function. The AP monitor 4 receives this alive message, and determines whether the alive message has been received within the AP fault detection time 21.

The monitored AP 5 advances processing of the AP, while periodically storing check-point information in the check-point region 25 indicated by the check-point identifier ID 24.

Figure 4:
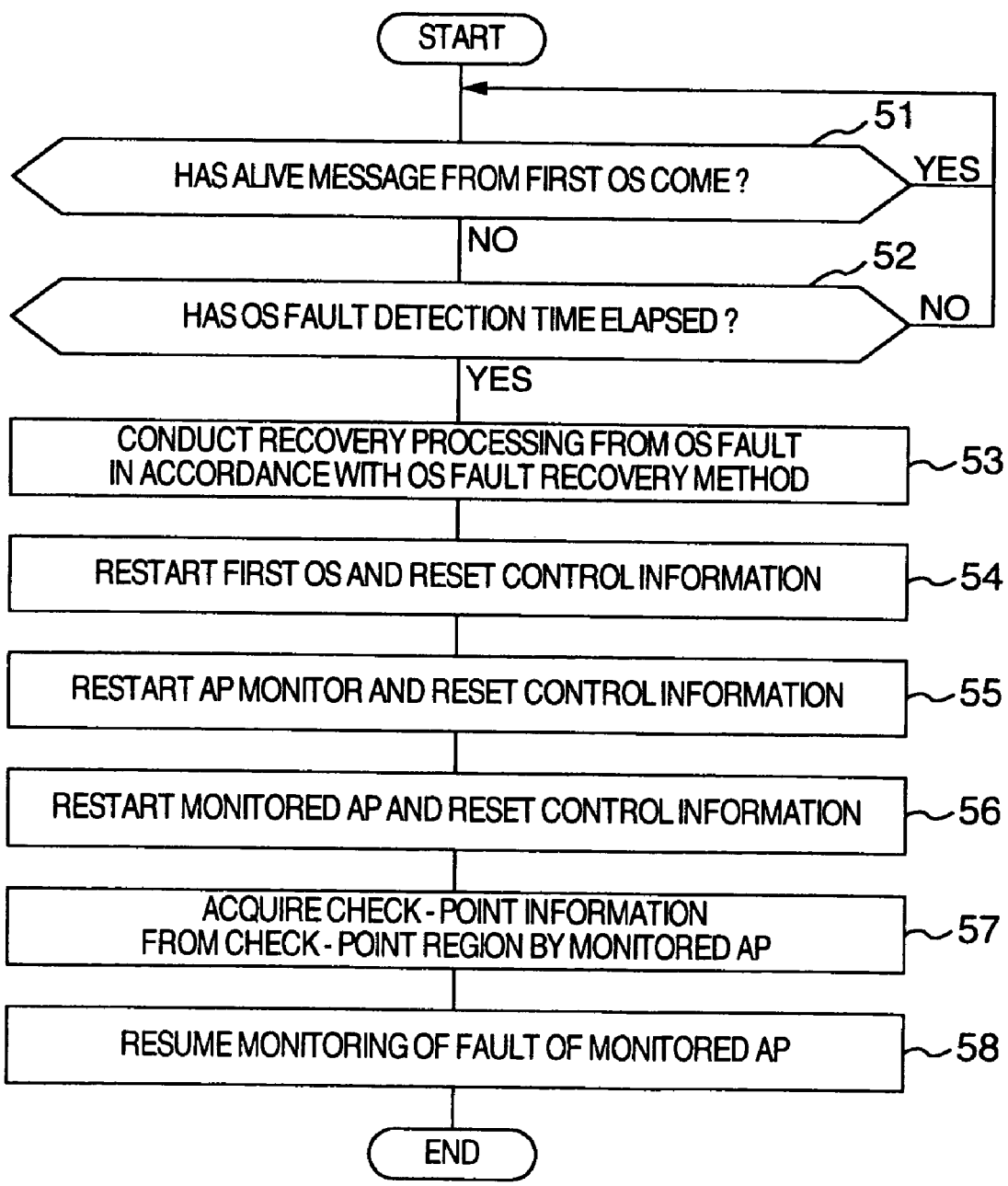
FIG. 4 is a flow chart showing the procedure of OS monitoring processing conducted by a high rank fault monitor 3 and recovery processing of a relating program at the time of an OS fault, in the embodiment shown in FIG. 1.

FIG. 4 is a flow chart showing the procedure of OS monitoring processing conducted by the high rank monitor 3 and recovery processing of a relating program at the time of an OS fault. The first OS 1 periodically executes a program for transmitting an alive message to the high rank monitor 3 by utilizing the inter-OS message passing function, and thereby automatically transmits an alive message to the high rank monitor 3. The transmission period of the alive message is a time within the OS fault detection time 13. The alive message includes the monitored subject ID 18 and a one-bit signal (1 or 0) indicating an alive or dead state. By referring to the monitored subject ID 18 of the high rank monitor control information 12, the high rank monitor 3 determines whether an alive message has come from the first OS 1 (step 51). When the high rank monitor 3 has received an alive message indicating an alive state (YES of step 51), a timer is reset and the processing returns to the step 51. If an alive message indicating an alive state is not received (NO of step 51) and the OS fault detection time 13 has not elapsed (NO of step 52), then the processing returns to the step 51.

If the OS fault detection time 13 has elapsed (YES of step 52), then the high rank monitor 3 judges the first OS 1 to have stopped due to a fault, and conducts processing for recovery from the OS fault in accordance with the OS fault recovery method 14 (step 53). The high rank monitor 3 requests the multi-OS controller 6 to conduct the recovery processing of the first OS 1 from a fault. The multi-OS controller 6 conducts the recovery processing of the first OS 1 from a fault. If fault information such as a memory dump of the first OS 1 is recorded in a disk or the like, it can be used to pursue the cause of a fault of the first OS 1 later. In this case, however, restart of the first OS 1 is delayed. There is trade-off between the requested restart time of the first OS 1 and the merit of recording. If the recovery processing is finished, then restart of the first OS 1 and resetting of control information are conducted (step 54). Even if a fault occurs in the first OS 1 and the first OS is restarted, the high rank monitor control information 12 located in the memory region of the second OS 2 is preserved. Since the high rank monitor 3 needs to detect the timing of restart termination of the first OS 1 and the OS fault recovery method 14 needs to be changeable, however, the high rank monitor 3 clears the OS fault detection time 13, the OS fault recovery method 14, and the monitored subject ID 18, and resets the OS fault detection time 13, the OS fault recovery method 14, and the monitored subject ID 18 in accordance with the above described procedure. The high rank monitor 3 transmits the monitored subject ID 18 to the first OS 1, and then restarts the fault monitoring of the first OS 1.

In the case where the first OS 1 is restarted due to the OS fault detection, the AP monitor 4 is also forcibly stopped. Therefore, restart of the AP monitor 4 and resetting of the control information are conducted (step 55). In the same way, the high rank monitor 3 clears the AP monitor fault detection time 15, the AP monitor fault recovery method 16, and the monitored subject ID 20, and resets the AP monitor fault detection time 15, the AP monitor fault recovery method 16, and the monitored subject ID 20 in accordance with the above described procedure. The high rank monitor 3 transmits the monitored subject ID 20 to the AP monitor 4, and then restarts the fault monitoring of the AP monitor 4.

Subsequently, the high rank monitor 3 conducts restarts of the monitored AP 5 and resetting of the control information (step 56). The monitored AP 5 recognizes its restart, and resets the AP fault detection time 21 and the AP fault recovery method 22 in accordance with the above described procedure. Subsequently, the monitored AP 5 acquires check-point information from the check-point region 25 indicated by the check-point identifier ID 24 (step 57). The AP monitor 4 resets the AP fault detection time 21 and the AP fault recovery method 22, and then restarts the fault monitoring of the monitored AP 5 (step 58). In the same way as the foregoing description, the monitored AP 5 periodically stores check-point information in the check-point region 25.

Figure 5:
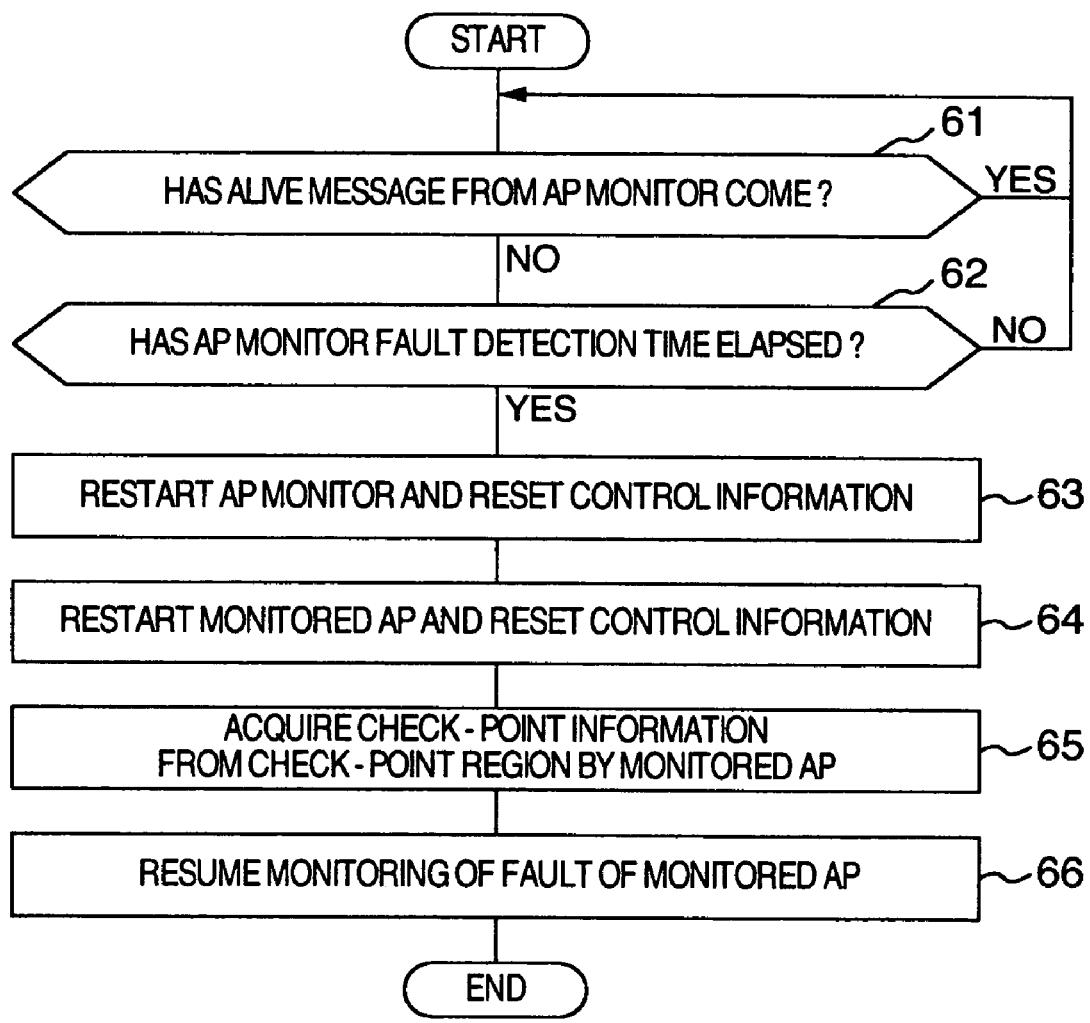
FIG. 5 is a flow chart showing the procedure of monitoring processing of an AP fault monitor conducted by a high rank fault monitor 3 and recovery processing of a related program at the time of a fault of the AP fault monitor, in the embodiment shown in FIG. 1.

FIG. 5 is a flow chart showing the procedure of AP monitor monitoring processing conducted by the high rank monitor 3 and recovery processing of a relating program at the time of an AP monitor fault. The AP monitor 4 calls a function for transmitting an alive message to the high rank monitor 3, and periodically transmits an alive message to the high rank monitor 3. The transmission period of the alive message is a time within the AP monitor fault detection time 15. The alive message includes the monitored subject ID 20 and a one-bit signal (1 or 0) indicating an alive or dead state. By referring to the monitored subject ID 20 of the high rank monitor control information 12, the high rank monitor 3 determines whether an alive message has come from the AP monitor 4 (step 61). When the high rank monitor 3 has received an alive message indicating an alive state (YES of step 61), a timer is reset and the processing returns to the step 61. If an alive message indicating an alive state is not received (NO of step 61) and the AP monitor fault detection time 15 has not elapsed (NO of step 62), then the processing returns to the step 61.

If the AP monitor fault detection time 15 has elapsed (YES of step 62), then the high rank monitor 3 judges the AP monitor 4 to have stopped due to a fault, and conducts processing for recovery of the AP monitor 4 from the fault in accordance with the AP monitor fault recovery method 16. Here, the AP monitor fault recovery method 16 conducts restart beginning from the AP monitor 4 and resetting of control information (step 63). The high rank monitor 3 clears the AP monitor fault detection time 15, the AP monitor fault recovery method 16, and the monitored subject ID 20, and resets the AP monitor fault detection time 15, the AP monitor fault recovery method 16, and the monitored subject ID 20 in accordance with the above described procedure. The high rank monitor 3 transmits the monitored subject ID 20 to the AP monitor 4, and then restarts the fault monitoring of the AP monitor 4.

It is necessary to do start setting of the monitored AP over again, with the restart of the AP monitor 4. Therefore, restarting of the monitored AP 5 and resetting of control information are conducted (step 64). The monitored AP 5 recognizes its restart, and resets the AP fault detection time 21 and the AP fault recovery method 22 in accordance with the above described procedure. Subsequently, the monitored AP 5 acquires check-point information from the check-point region 25 indicated by the check-point identifier ID 24 (step 65). The AP monitor 4 resets the AP fault detection time 21 and the AP fault recovery method 22, and then restarts the fault monitoring of the monitored AP 5 (step 66). In the same way as the foregoing description, the monitored AP 5 periodically stores check-point information in the check-point region 25.

If restart beginning from the first OS 1 is set in the AP monitor fault recovery method 16, the high rank monitor 3 conducts the processing of the step 53, and thereafter the processing of the steps 54 to 58 is conducted.

Figure 6:
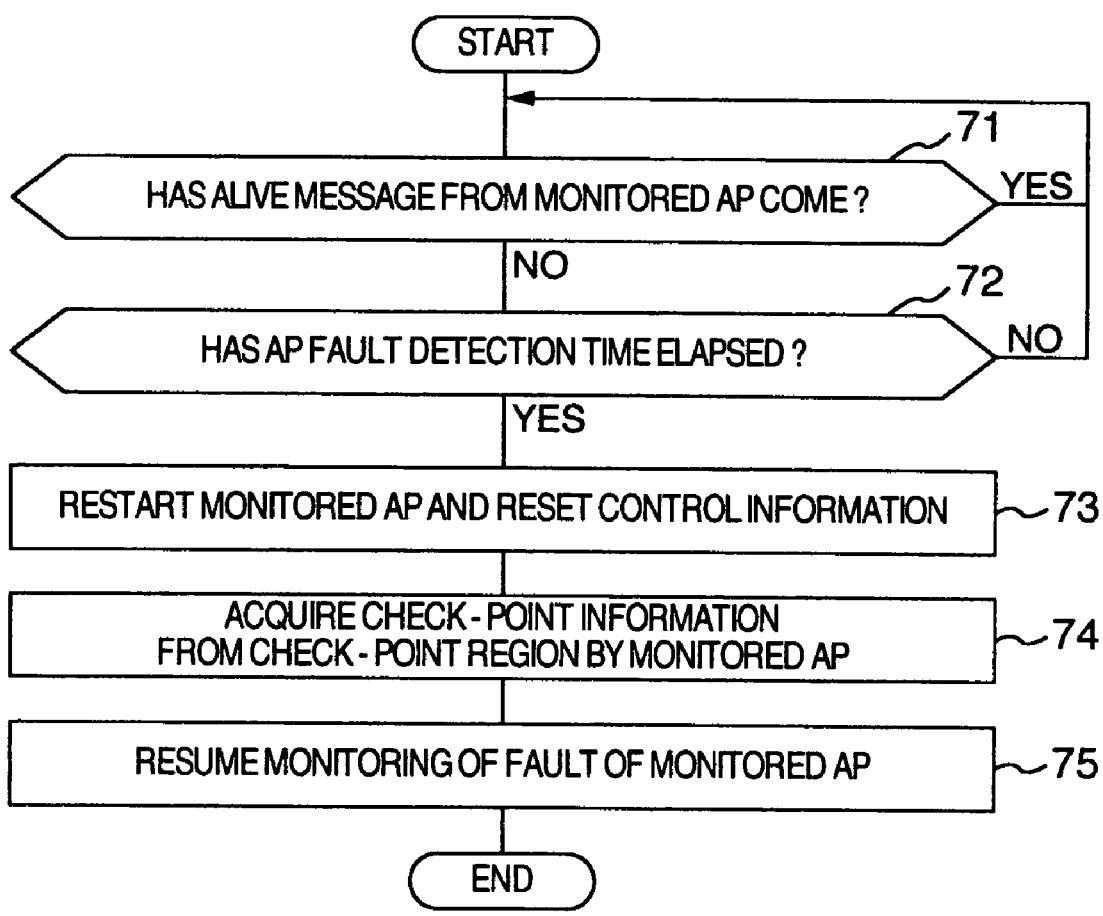
FIG. 6 is a flow chart showing the procedure of monitoring processing of a monitored AP conducted by an AP fault monitor 4 and recovery processing of a related program of the monitored AP at the time of a fault, in the embodiment shown in FIG. 1.

FIG. 6 is a flow chart showing the procedure of monitored AP fault monitoring processing conducted by the AP monitor 4 and recovery processing of a relating program at the time of a monitored AP fault. The monitored AP 5 calls a function for transmitting an alive message to the AP monitor 4, and periodically transmits an alive message to the AP monitor 4. The transmission period of the alive message is a time within the AP fault detection time 21. The alive message includes a 1-bit signal indicating an alive or dead state. The AP monitor 4 determines whether an alive message has come from the monitored AP 5 (step 71). When the AP monitor 4 has received an alive message indicating an alive state (YES of step 71), a timer is reset and the processing returns to the step 71. If an alive message indicating the alive state is not received (NO of step 71) and the AP fault detection time 21 has not elapsed (NO of step 72), then the processing returns to the step 71.

If the AP fault detection time 21 has elapsed (YES of step 72), then the AP monitor 4 judges the monitored AP 5 to have stopped due to a fault, and conducts processing for recovery of the monitored AP 5 from the fault in accordance with the AP fault recovery method 22. Here, assuming that the AP fault recovery method 22 sets restart of only the monitored AP 5, restart of the monitored AP 5 and resetting of control information are conducted (step 73). The monitored AP 5 recognizes its restart, and resets the AP fault detection time 21 and the AP fault recovery method 22 in accordance with the above described procedure. Subsequently, the monitored AP 5 acquires check-point information from the check-point region 25 indicated by the check-point identifier ID 24 (step 74). The AP monitor 4 resets the AP fault detection time 21 and the AP fault recovery method 22, and then restarts the fault monitoring of the monitored AP 5 (step 75). In the same way as the foregoing description, the monitored AP 5 periodically stores check-point information in the check-point region 25.

If restart beginning from the AP monitor 4 is set in the AP fault recovery method 22 and restart beginning from the AP monitor 4 is set in the AP monitor fault recovery method 16, then the AP monitor 4 transmits an alive message indicating death of the AP monitor 4 to the high rank monitor 3, and thereby processing of steps 63 to 66 is conducted. If a series of restart operations beginning from restart of the first OS 1 and followed by restart of the AP monitor 4 is set in the AP fault recovery method 22 and a series of restart operations beginning from restart of the first OS 1 and followed by restart of the AP monitor 4 is set in the AP monitor fault recovery method 16, then the high rank monitor 3 conducts processing of the step 53, and thereafter processing of steps 54 to 58 is conducted.

What is claimed is:

1. A fault monitoring method in a computer including a first operating system (OS), a second OS, and a multi-OS controller having a communication function between said first OS and said second OS, said fault monitoring method comprising the steps of:

loading said first OS, said second OS and said multi-OS controller into a memory included in the computer;

executing said first OS, said second OS and said multi-OS controller by using a processor included in the computer under control of said multi-OS controller;

successively receiving, in a fault monitor activated by execution of a program on said second OS, an alive message indicating an alive state of said first OS transmitted from said first OS by using the multi-OS controller; and restarting said first OS, when a reception interval of said alive message has exceeded a predetermined time in said fault monitor.

2. A fault monitoring method according to claim 1, wherein said fault monitor determines whether said alive message has exceeded said predetermined time by comparing the reception interval of said alive message with predetermined time information stored in said memory.

3. A fault monitoring method according to claim 2, wherein said fault monitor restarts said first OS in accordance with a restart method stored in said memory by using said multi-OS controller loaded in said memory.

4. A fault monitoring method according to claim 1, wherein said multi-OS controller manages said resources by dividing said resources to provide divided resources to said first OS and said second OS, respectively.

5. A fault monitoring method according to claim 1, wherein said communication function between said first OS and said second OS includes a function in which one OS calls a process to be executed by the other OS.

6. A multi-operating system (OS) computer having a fault monitoring function, comprising:

a processor;

a memory;

a first OS loaded on said memory by said processor;

a second OS loaded on said memory by said processor;

a multi-OS controller, having a inter-OS communication function between said first OS and said second OS, loaded on said memory by said processor; and a fault monitor activated by execution of a program on said second OS, wherein by using said inter-OS communication function of said multi-OS controller, said fault monitor successively receives an alive message indicating an alive state of said first OS transmitted from said first OS, and when a reception interval of said alive message has exceeded a predetermined time, said fault monitor restarts said first OS.

7. A multi-OS computer according to claim 6, wherein said fault monitor determines whether said alive message has exceeded said predetermined time by comparing the reception interval of said alive message with predetermined time information stored in a memory included in said computer.

8. A multi-OS computer according to claim 7, wherein said fault monitor restarts said first OS in accordance with a restart method stored in said memory by using said multi-OS controller loaded in said memory.

9. A multi-OS computer according to claim 6, wherein said multi-OS controller manages resources by dividing said resources to provide divided resources to said first OS and said second OS, respectively.

10. A multi-OS computer according to claim 6, wherein said communication function between said first OS and said second OS includes a function in which one OS calls a process to be executed by the other OS.

11. A computer readable storage medium for storing a program, said program comprising:
- a first operating system (OS);
- a second OS different from said first OS;
- a multi-OS control program unit for managing computer resources, said multi-OS control program unit having an inter-OS communication function between said first OS and said second OS; and
- a fault monitoring program unit for monitoring a fault of said first OS via said inter-OS communication function, said fault monitoring program unit operating on said second OS,
- wherein said first OS, said second OS, said multi-OS control program unit and said fault monitoring program unit are loaded in a memory included in said computer.

12. A computer readable storage medium according to claim 11, wherein a multi-OS controller executes said multi-OS control program unit to manage said resources by dividing said resources to provide divided resources to said first OS and said second OS, respectively.

13. A computer readable storage medium according to claim 11, wherein said inter-OS communication function includes a function in which one OS calls a process to be executed by the other OS.

14. An operating system (OS) fault monitoring method for a computer, said computer including a first OS, a second OS different from said first OS, a multi-OS controller for managing computer resources, said multi-OS control unit having an inter-OS communication unit between said first OS and said second OS, and a fault monitor operating on said second OS, said OS fault monitoring method comprising the steps of:
- loading said first OS, said second OS, said multi-OS controller and said fault monitor in a memory included in said computer;
- transmitting an alive message from said first OS to said fault monitor via said inter-OS communication unit and said second OS; and
- determining whether said alive message has been received by said fault monitor within a predetermined time.

15. An OS fault monitoring method according to claim 14, wherein when said alive message is not received by said fault monitor though a predetermined time has elapsed, said first OS is restarted in accordance with a preset OS recovery method stored in said memory by using said multi-OS controller and said fault monitor.

16. An OS fault monitoring method according to claim 14, wherein said multi-OS controller manages said resources by dividing said resources to provide divided resources to said first OS and said second OS, respectively.

17. An OS fault monitoring method according to claim 14, wherein said inter-OS communication function includes a function in which one OS calls a process to be executed by the other OS.

* * * * *